US007228997B1

(12) United States Patent
Thompson

(10) Patent No.: US 7,228,997 B1
(45) Date of Patent: Jun. 12, 2007

(54) NAILING CHUCK

(75) Inventor: Terry Thompson, Minneapolis, MN (US)

(73) Assignee: Engineering Technologies, Inc., Minneapolis, MN (US)

( * ) Notice: Subject to any disclaimer, the term of this patent is extended or adjusted under 35 U.S.C. 154(b) by 84 days.

(21) Appl. No.: 11/082,366

(22) Filed: Mar. 16, 2005

Related U.S. Application Data

(60) Provisional application No. 60/553,392, filed on Mar. 16, 2004.

(51) Int. Cl.
*B23P 21/00* (2006.01)

(52) U.S. Cl. .......................... 227/110; 227/111; 227/3; 227/5; 227/7

(58) Field of Classification Search ................ 227/110, 227/111, 143, 3, 5, 7, 100; 29/430, 432, 29/428; 100/269.06, 269.07, 913
See application file for complete search history.

(56) References Cited

U.S. PATENT DOCUMENTS

| | | | | | |
|---|---|---|---|---|---|
| 3,552,624 | A | * | 1/1971 | Dykeman et al. | 227/3 |
| 3,557,439 | A | * | 1/1971 | Dykeman | 29/430 |
| 3,591,067 | A | * | 7/1971 | Vial | 227/84 |
| 3,763,547 | A | * | 10/1973 | Blakeslee | 29/430 |
| 3,847,321 | A | * | 11/1974 | Charlez | 227/7 |
| 3,905,282 | A | * | 9/1975 | Heavner et al. | 493/89 |
| 3,968,560 | A | * | 7/1976 | Vial | 29/430 |
| 4,005,520 | A | * | 2/1977 | Sanford | 29/432 |
| 4,033,025 | A | * | 7/1977 | Jureit et al. | 29/417 |
| 4,054,236 | A | * | 10/1977 | Paxton | 227/45 |
| 4,757,605 | A | * | 7/1988 | Richardelli | 29/709 |
| 4,782,989 | A | | 11/1988 | Wallin et al. | 227/149 |
| 4,793,540 | A | * | 12/1988 | Mangan et al. | 227/7 |
| 4,829,651 | A | * | 5/1989 | Shirai | 29/430 |
| 4,867,364 | A | | 9/1989 | Wallin et al. | 227/7 |
| 4,900,329 | A | * | 2/1990 | Richardelli | 29/430 |
| 5,095,605 | A | * | 3/1992 | Tonus | 29/432 |
| 5,220,718 | A | * | 6/1993 | Speller et al. | 29/431 |
| 5,249,352 | A | * | 10/1993 | Landers | 29/432 |
| 5,312,022 | A | | 5/1994 | Thompson et al. | 227/130 |
| 5,375,315 | A | * | 12/1994 | Griffith et al. | 29/432 |
| 5,379,513 | A | | 1/1995 | Thompson et al. | 29/772 |
| 5,469,610 | A | * | 11/1995 | Courian et al. | 29/243.521 |
| 5,564,614 | A | | 10/1996 | Yang | 227/142 |
| 5,651,169 | A | * | 7/1997 | Ohuchi et al. | 29/243.525 |
| 5,785,227 | A | | 7/1998 | Akiba | 227/8 |
| 5,873,510 | A | | 2/1999 | Hirai et al. | 227/130 |

(Continued)

*Primary Examiner*—Brian Nash
(74) *Attorney, Agent, or Firm*—Z. Peter Sawicki; Westman, Champlin & Kelly

(57) ABSTRACT

An apparatus nails a plurality of cross members to an underlying stringer to produce a pallet. The carriage moves in a continuous motion without stopping over the cross members until the cross members are nailed to the stringer. The carriage includes at least one nailing gun for driving nails and a hydraulic accumulator mounted on the carriage in hydraulic communication with the at least one nailing gun for supplying hydraulic fluid to provide a force to the nailing gun to nail the cross members to the stringer. The nailing gun may be pivotally secured to the carriage wherein the nailing gun pivots with respect to the carriage while driving a nail into the cross member and the underlying stringer. The nail gun is also positioned into a nail driving position pneumatically and when in the nail driving position the hydraulic cylinder is actuated to drive the nail into the cross member.

11 Claims, 5 Drawing Sheets

U.S. PATENT DOCUMENTS 5,960,721 A * 10/1999 Huetteman et al. ...... 108/57.17
6,318,251 B1 * 11/2001 Schulz ........................ 100/48
6,430,800 B1 * 8/2002 Buck ........................... 29/430
6,431,428 B1 8/2002 Chen .......................... 227/120
6,499,206 B1 * 12/2002 Eure et al. .................... 29/430
6,527,156 B2 3/2003 McAllister et al. ............ 227/7
6,533,156 B1 3/2003 Chang ........................ 227/130
6,584,915 B1 * 7/2003 Rogers ...................... 108/56.1
6,736,591 B2 * 5/2004 Buck ....................... 414/797.9

* cited by examiner

NAILING CHUCK

The present application is based on and claims the benefit of U.S. provisional patent application Ser. No. 60/553,392, filed Mar. 16, 2004, the content of which is hereby incorporated by reference in its entirety.

BACKGROUND OF THE INVENTION

The present invention relates to an apparatus and method for driving nails into an object. In particular, the present invention relates to an apparatus and method for rapidly driving nails with a hydraulic system and a pneumatic system.

An item commonly used to transport goods that requires its component parts to be nailed together is a wooden pallet. Wooden pallets began being used in industry in the 1930s. Wooden pallets came into widespread use by the United States Navy during World War II to move large amounts of goods in a short period of time with forklifts. Since World War II the use of wooden pallets has steadily increased every year.

It is estimated that currently there are about 1.5 billion pallets used in the United States alone. There is an estimated construction of 700 million new pallets each year while an additional 700 million wood pallets are being annually repaired.

To keep up with the high demand, wooden pallets are being mass-produced with automated pallet making machines. The automatic pallet making machines typically include nail guns that are mounted on a frame and are aligned with stringers used to make the pallet. A majority of the mass produced pallets are built on automated machines using hydraulic nailing guns. On these machines, the relative motion between the nail gun and the material being nailed stops while the nail is driven into the material. One limiting factor in the production of wooden pallets is the average speed of the material relative to the nail gun. The relative motion between the material and the nail gun is a limiting factor because the material stops while the nail is driven.

Additionally, the speed at which a nail is driven by a hydraulic system requires the material be stationary while the nail is driven. The additional time required to drive the nail into the material also has made the hydraulic system a limiting factor in the mass production of pallets.

SUMMARY OF THE INVENTION

The present invention includes an apparatus for nailing a plurality of cross members to an underlying stringer in which the stringer and the plurality of cross member are positioned on a support. A carriage moves in a continuous motion without stopping over the plurality of cross members until the plurality cross members are nailed to the stringer. At least one nailing gun is secured to the carriage for driving nails in to the cross members and the underlying stringer to secure the cross members to the stringer. A hydraulic accumulator is mounted on the carriage and is in hydraulic communication with the at least one nailing gun for supplying hydraulic fluid under pressure to provide a force to the nailing gun for nailing the cross member to the stringer.

The at least one nailing gun may also be pivotally secured to the carriage for driving nails into the cross members and the underlying stringer wherein the nailing gun pivots with respect to the carriage while driving a nail into the cross member and the underlying stringer thereby permitting the carriage to move without stopping.

The apparatus may also include the at least one nail gun having a chuck portion which contacts the wood during the nailing operation and is pneumatically driven to the wood and wherein a hydraulic cylinder actuates the nail driving mechanism moving it through the wood chuck to drive nails into the cross members and the underlying stringer.

DETAILED DESCRIPTION OF THE PREFERRED EMBODIMENTS

The present invention includes a nailing carriage that moves in a continuous fashion for nailing cross members to underlying stringers. By continuous motion is meant that the carriage does not stop while nailing. Such a carriage does not require carriage brakes as prior art devices, and also requires a relatively inexpensive electric motor with a variable frequency drive to power the movement of the nailing carriage. Prior art devices required expensive servo motors or carriage brakes in conjunction with a hydraulic motor drive to stop the carriage when the nails are being driven. The nailing carriage of the present invention moves approximately an average of 5.5 inches per second when compared to prior art devices which move approximately an average of 3 inches per second due to the stoppage that has to occur when the nailing guns drive nails into the cross members and into the underlying stringers.

Some of the elements that permit continuous motion of the nailing carriage of the present invention include a high speed nailing chuck having a pneumatic cylinder with a 1 inch bore that drives the chuck body of the nailing chuck down to the wood. Another aspect of the continuously moving the nailing carriage of the present invention is a hydraulic accumulator mounted on the nailing carriage in close proximity to the hydraulic nailing chuck cylinder thereby reducing hydraulic head losses. Reducing hydraulic head losses creates higher flow and reduces nail driving times. Furthermore, the nail chuck of the present invention pivots with respect to the frame allowing relative motion between the moving nailing carriage and the stationary cross members while nails are being driven.

Figure 1:
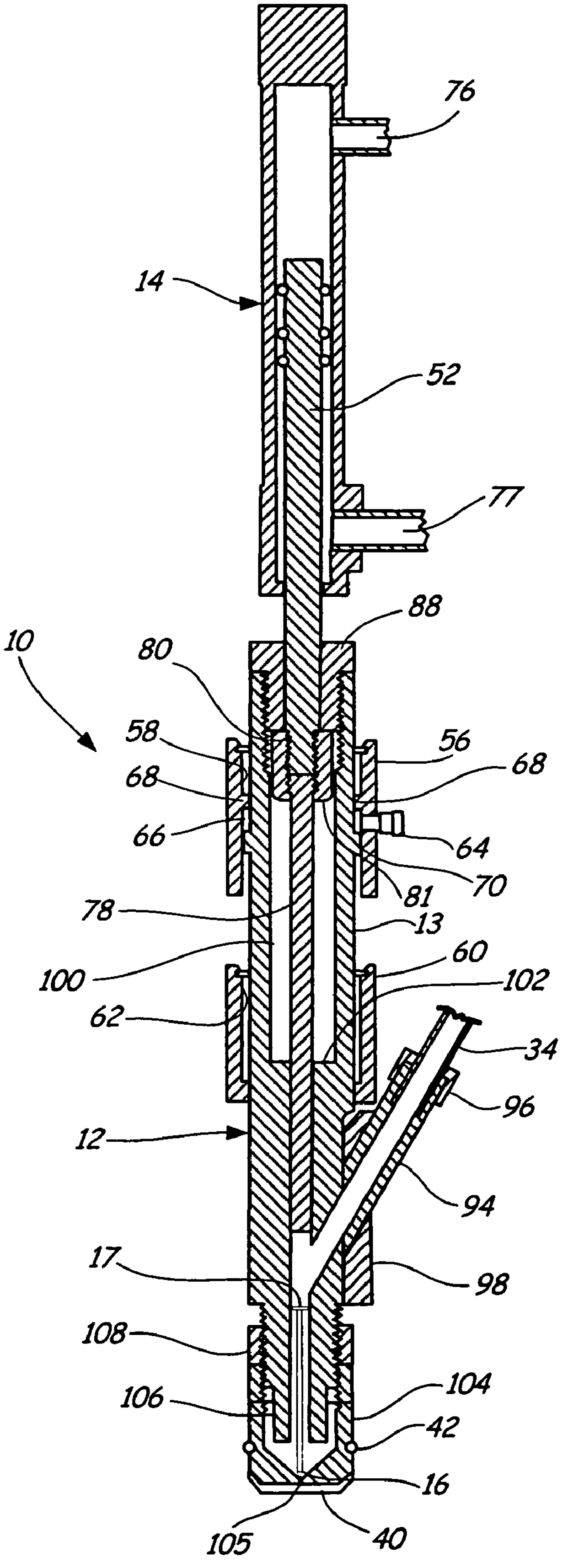
FIG. 1 is a sectional view of the nail gun of the present invention.

A nail gun of the present invention is generally illustrated at 10 in FIG. 1. The nail gun 10 includes a nail chuck 12 and a hydraulic cylinder 14 and is designed to be mounted to a machine that secures at least two components together with a nail 16.

Figure 2:
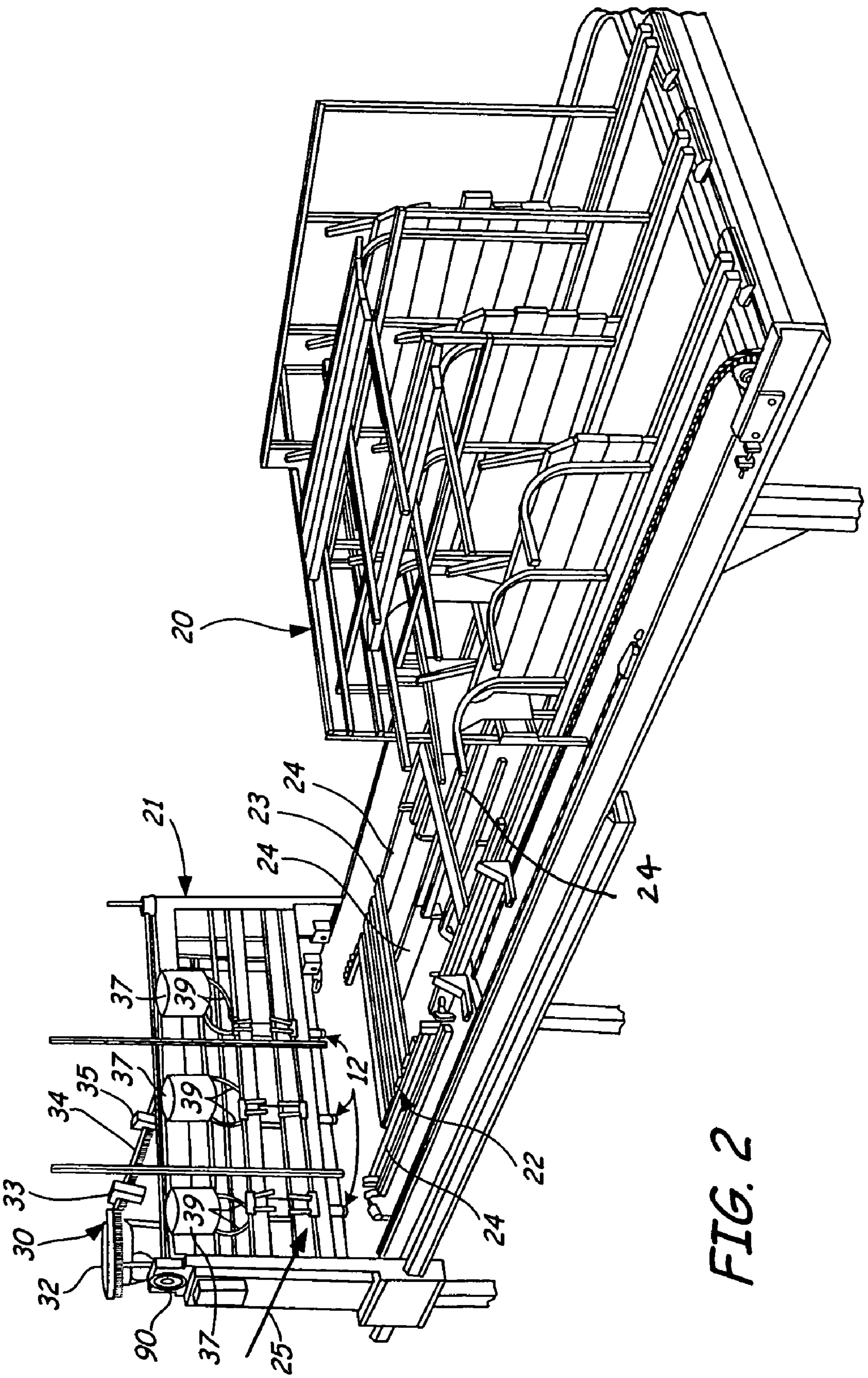
FIG. 2 is a perspective view of an automatic pallet-making machine employing the nail gun of the present invention.

One such machine is an automated pallet making machine 20 illustrated in FIG. 2. Throughout the application, the nail gun 10 of the present invention will be referenced in association with the automated pallet making machine 20 and the production of pallets 22. However, the nail gun 10 can also be used in other applications besides the production of pallets. Additionally, the nail gun 10 does not have to be secured to a machine used to mass-produce goods, but rather the nail gun 10 can be mounted to any object that securely retains the nail gun 10.

The exemplary automatic pallet-making machine 20 includes three nail guns 10 that are aligned with three stringers 24 of the pallet 22. The number of nail guns 10 employed by the automatic pallet-making machine 20 varies with corresponding number of the stringers 24 used to construct the pallet 22.

Figure 3:
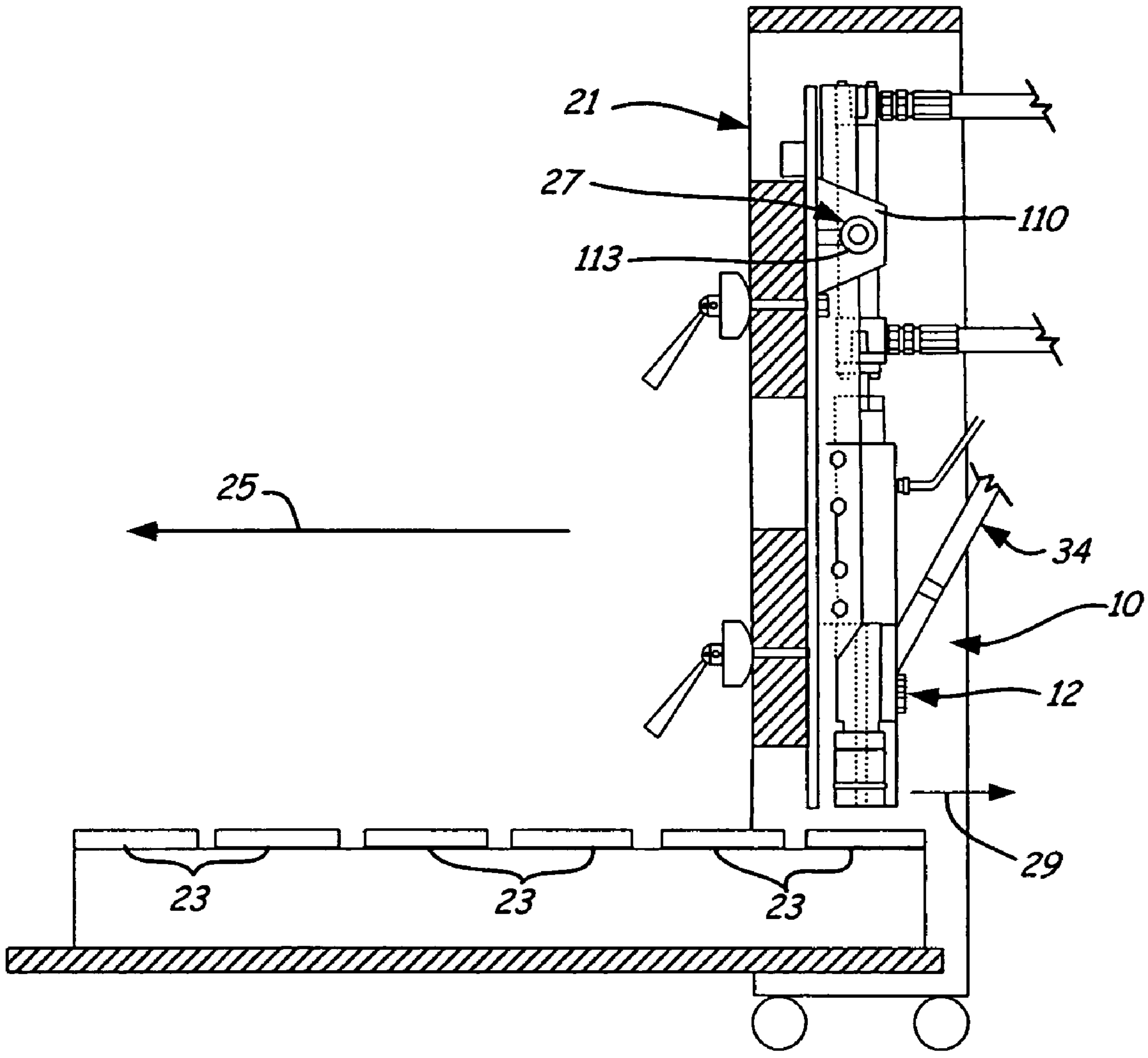
FIG. 3 is a side sectional view of the nail gun of the present invention mounted to a frame.
Figure 4:
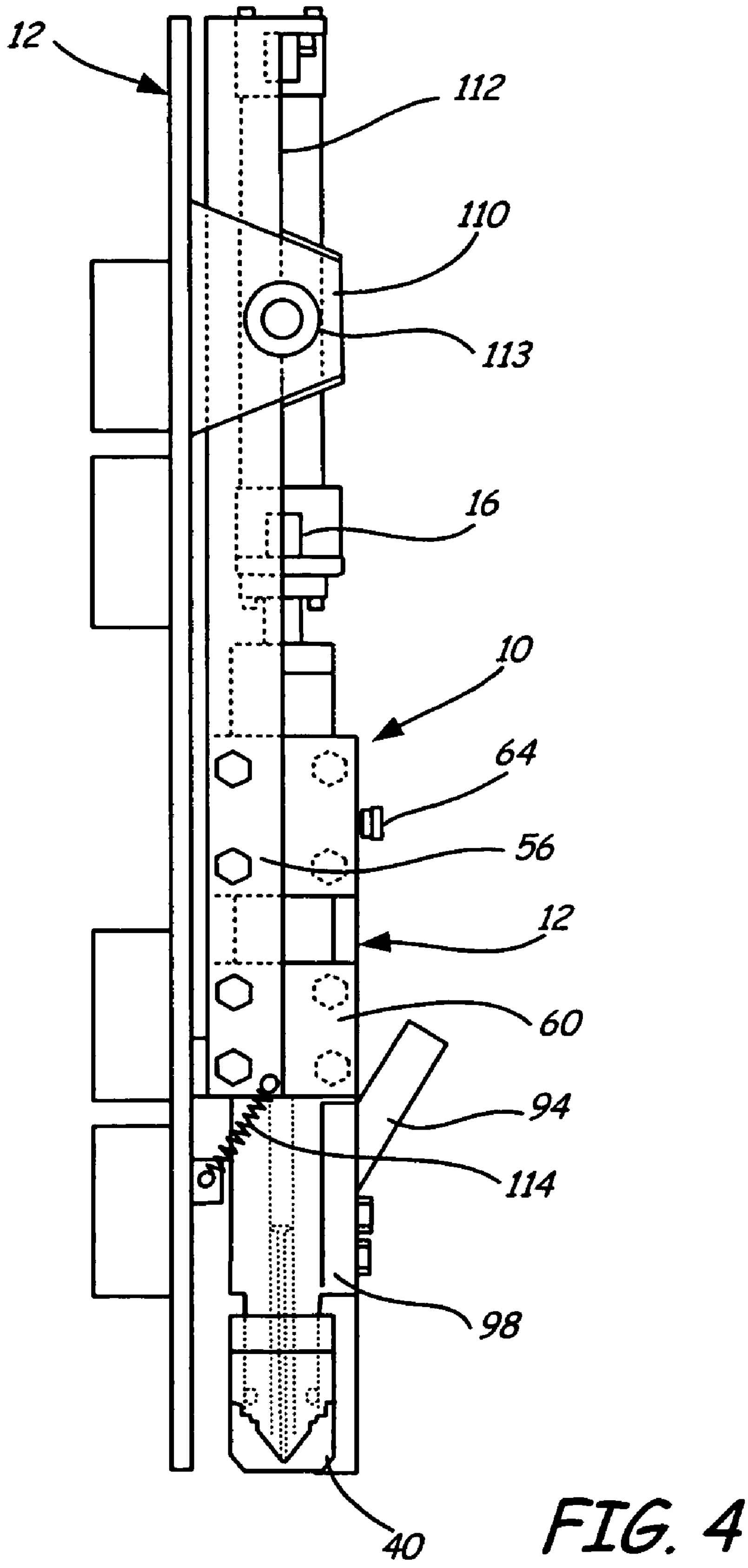
FIG. 4 is a side view of the nail gun of the present invention mounted to a frame.

Referring to FIGS. 1, 2 and 3, nails 16 are fed into the nail chuck 12 through a singulating system 30. The singulating system 30 properly aligns the nails 16 such that a head 17 of one nail 16 is proximate a pointed end of another nail. The singulating system 30 includes a vibrating bin 32 that holds a quantity of nails 16. The aligned nails 16 exit the bin 32 through a valve 33 controlled by a programmable logic controller (PLC) 50 as illustrated in FIG. 4.

Referring to FIGS. 1, 2, 3 and 4, the nails 16 are fed into the nail chuck 14 through a second valve 35 also controlled by the PLC 50 and enter a tube 34 that feeds the nails 16 to the nail chuck 12. Because the nail chuck 12 and the hydraulic cylinder 14 move to drive the nails 16 into an object, the tube 34 feeding the nails 16 to the nail chuck 14 preferably is flexible and made of a vinyl or a PVC material.

The nail 16 is retained in a selected position within the nail chuck 14 by a pair of opposing spring-loaded nail keepers 40 (one of which is shown). Preferably, a circular spring 42 is positioned about and biases the pair of nail keepers 40 together such that the nail 16 is retained in the selected position therebetween.

The nail 16 is driven into an object with a hydraulic system 46 acting upon the hydraulic cylinder 14 in combination with a pneumatic system 48 acting upon the nail chuck 12. Preferably, the pneumatic system 48 and the hydraulic system 46 are controlled by the PLC 50 such that the PLC 50 simultaneously activates both the pneumatic system 48 to force the nail chuck 12 into contact with a cross board 23 and the hydraulic system 46 forces a hydraulic ram 52 into the nail 16 which drives the nail 16 into the cross board 23 and stringer 24. An exemplary PLC is series 9030 controller manufactured by GE Fanuc located at 2500 Austin Drive, Charlottesville, Va. 22911.

The pneumatic system 48, which is more responsive than the hydraulic system 46, positions the nail chuck 12 proximate the cross board 23 while the hydraulic system 46 begins driving the nail 16 toward the cross board 23 and the stringer 24. With the nail chuck 12 manipulated into a position adjacent the cross board 23 by the pneumatic system 48, the hydraulic system 46 forces the hydraulic ram 52 from the hydraulic cylinder 16 to drive the nail 16 into the stringer 24 and the cross board 23. The combination of the pneumatic system 48 cooperating with the hydraulic system 46 reduces the cycle time between nails 16 being driven as compared to a hydraulic system both manipulating the nail chuck 12 into position and driving the nail 16 into the pallet 22.

Referring to FIG. 1, the nail chuck 12 is positioned within through bores 58, 62 of upper and lower linear motion bearings 56, 60, respectively that slidably guide the movement of the nail chuck 12 toward and away from the pallet 22. The preferred linear bearing are Oilite AA-2001-11 manufactured by Beamer Precision, Inc. located at 230 New York Drive, Fort Wash., Pa. 19034-0980.

The upper linear motion bearing 58 includes a nozzle 64 through which pressurized gas is forced into a chamber 66 defined by a shoulder 68 extending from the linear bearing and contacting an outer surface 13 of the nail chuck 12 and a ring 70 extending from the outer surface 13 of the nail chuck 12 and forming a seal with a surface defining the through bore 58 within the upper linear bearing 56. The PLC 50 controls a valve 72 to begin flow of the pressurized gas into the chamber 66 as illustrated in FIG. 4. As pressure is built up in the chamber 66 by the compressed gas, the nail chuck 12 is forced towards the cross board 23. Preferably, the compressed gas is compressed air.

While the nail chuck 12 is being forced proximate the cross board 23 with the pneumatic system 48, the PLC 50 sends a signal to a control valve 74 that directs high pressure hydraulic fluid from an accumulator 37 mounted on the carriage 21 into an upper port 76 of a hydraulic cylinder 14 which forces a ram 52 of the hydraulic cylinder 14 towards the nail 16. A drive pin 78 that is coupled to the ram 52 by a threaded retaining nut 80 engages the head 17 of the nail 16 and drives the nail 16 into the cross board 23 and the stringer 22. Since the hydraulic accumulator is mounted on the carriage 21 it is in close proximity to the hydraulic cylinder. The close proximity of the hydraulic accumulator 37 to the hydraulic cylinder 14 minimizes the length of the hydraulic lines 39 reducing hydraulic head losses, creating faster flow of hydraulic fluid thereby resulting in fast nail driving. The close proximity of the hydraulic accumulator 37 to the hydraulic cylinder 14 by mounting on the carriage 21 results in nails driven in approximately 100 milliseconds or less for a typical pallet nail approximately 2.5 inches long when compared to prior art devices such as a Champion nailing carriage produced by Viking Engineering and Development Company which drives nails in approximately 180 milliseconds. The present invention, close proximity of the accumulator to the hydraulic nailing valves that control the nail chuck reduces hydraulic pressure losses about 300 pounds per square inch when compared to prior art systems such as a Champion nailing carriage in which the accumulator is not located on the nailing carriage.

The hydraulic system 46 is pressurized with a hydraulic pump 82. The hydraulic system 46 includes a hydraulic fluid accumulator 84 positioned near the control valves 74. The pump 82 is connected to the accumulator 84 and the valves 74 with a hydraulic pressure line 86. The hydraulic accumulator 84 provides the necessary high pressure hydraulic fluid to the hydraulic system 46 to actuate as many hydraulic cylinders 16 of the nail guns 10 as necessary during a cycle. Preferably, the hydraulic accumulator 84 and the hydraulic valves 74 are positioned proximate the hydraulic cylinders 16 of the nail guns 10 to minimize pressure drop in the hydraulic system 46 such that the cycle time for driving the nails 16 is minimized.

Once the nail 16 is driven into the cross board 23 and the stringer 24, the controller 50 sends another signal to the hydraulic valves 74 to redirect the high-pressure hydraulic fluid to a lower port 77 of the hydraulic cylinder 16 such that the hydraulic ram 52 is retracted back into the cylinder 14. As the hydraulic ram 52 is retracted back into the cylinder 14, the nail chuck 12, which is coupled to the hydraulic ram 52 with a threaded cap 88 that threadably engages the nail chuck 12, is also retracted from the cross board 23 by the engagement of the threaded cap 88 with the threaded nut 80.

Figure 5:
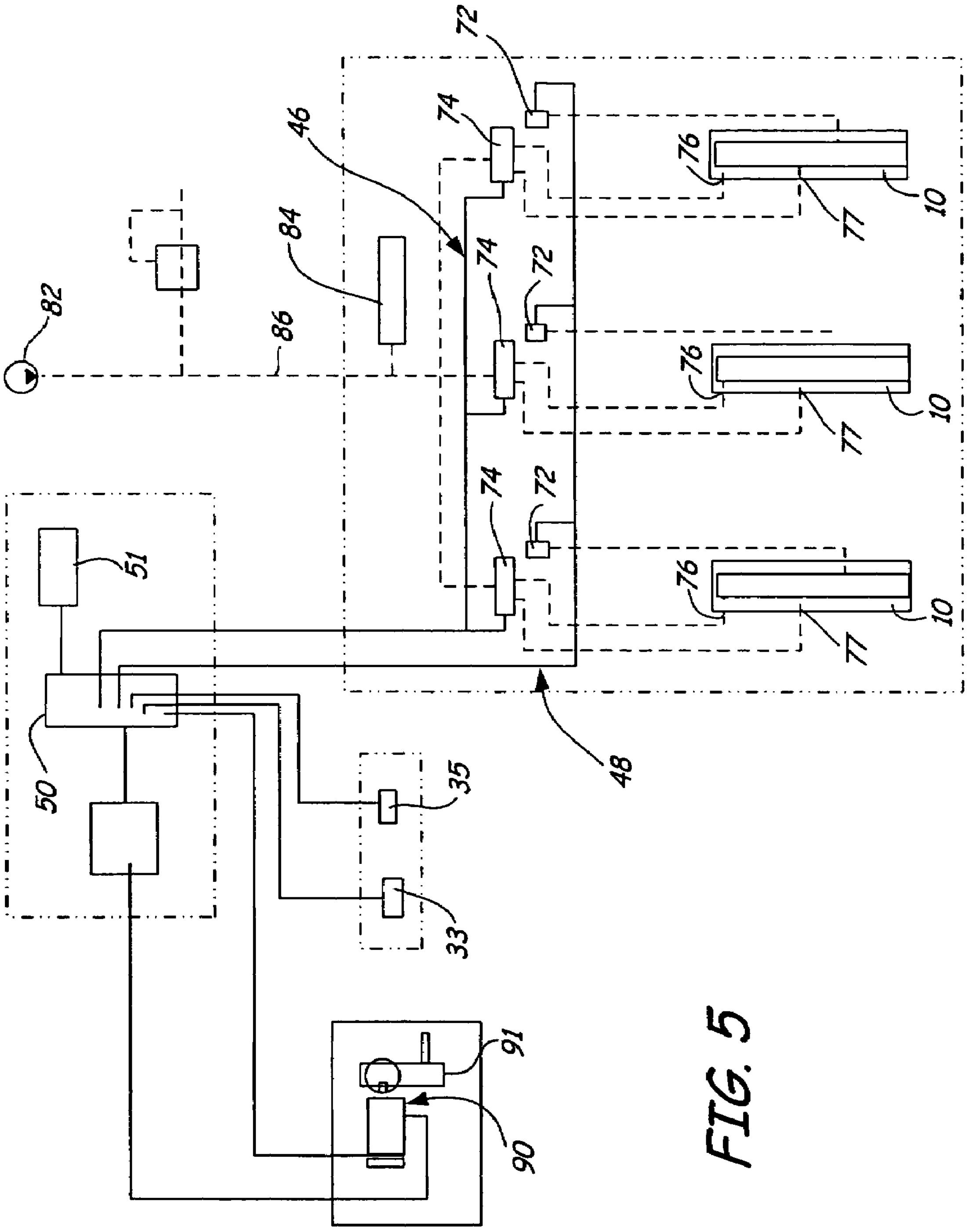
FIG. 5 is a schematic view of the control system for the nail gun of the present invention.

With the nail chuck 12 retracted from the cross board 23, an electric motor 90 coupled to a frame 21 that retains the nail gun 10, moves the frame 21 along with the nail gun 10 in the direction of arrow 25 to another selected position, as illustrated in FIG. 3 with an encoder or high speed counter within the PLC 50 as illustrated in FIG. 5. The PLC 50 sends a signal to the electric motor 90 to move the frame 21 to a selected location where a nail 16 is to be driven into the cross board 23. With the frame in the selected position, a brake 91 engages the motor 90 and retains the frame in the selected position.

The speed at which nails 16 driven into the cross board 23 and the stringer 24 is increased because of the pneumatic system 48 cooperation with the hydraulic system 46 in driving the chuck 12 into contact with the cross board 23. The PLC 50 also has an interface 57 which allows the control parameters to be adjusted.

With the frame 21 in the selected position, the valve 35 is opened by the PLC 50 to deliver another nail 16 to the nail chuck 12 through the flexible tube 34 through a port 94 that is angled into the chuck 12. A nut 96 threadably engages the port 94 and frictionally retains the tube 34 to the port 94. The angle of the port 94 allows the nail 16 to slide into the chuck 12 and between the nail grippers 40. The port 94 is secured to the chuck 12 with a holder 98 that is bolted to the chuck 12.

Referring to FIG. 1, the nail chuck 12 also includes adjusting mechanisms for adjusting a depth of the head 17 of the nail 16 into the cross board 23. The depth of the head 17 of the nail 16 can be adjusted such that the head 17 is above the cross board 23, even with the cross board 23, or countersunk into the cross board 23.

The depth of the nail head 17 is adjusted by manipulating the threaded nut 80 that retains the driving pin 78 to the hydraulic ram 52. The depth of the nail head 17 is adjusted such that an end 81 of the threaded nut contacts a shoulder 102 of a bore 100 of the chuck 12 thereby limiting the stroke of the hydraulic ram 52. By limiting the stroke of the hydraulic ram 52, the distance that the nail 16 can be driven is also limited or extended depending upon whether the end 81 is closer to the hydraulic ram 52 or farther from the hydraulic ram 52, respectively.

The depth of the nail head 17 can also be adjusted by manipulating a nose 104 that threadably engages a threaded outer surface 106 of the chuck 12. The nose 104 is rotated on the chuck 12 to threadably engage the chuck 12 and move the nose 104 to a selected position such that an end 105 of the nose 104 extends from the chuck 12. One skilled in the art will recognize that by manipulating the distance that the end 105 of the nose 104 is from the chuck 12, the depth of the nail head 17 can be adjusted because of the limited range of the hydraulic ram 52. With the end 106 of the nose 104 proximate the nail chuck 12 the nail head 17 can be driven further into the cross board 23 than if the end 105 of the nose 104 is farther away from the nail chuck 12. With the nose 104 in a selected position, a locking nut 108 threadably engaged with the chuck 12 is positioned to frictionally engage the nose 104 and retain the nose 104 in the selected position.

Referring to FIGS. 3, 4 and 5, the nail gun 10 is pivotally mounted at pivot point 27 to the movable frame 21 of the automatic pallet making machine 20 with brackets 110 that engage plates 112 that are secured to opposite sides of the linear bearings 56, 60 and the hydraulic cylinder 14. Bolts 113 are positioned between through bores in the brackets 110 aligned with a through bore in each plate 112 such that the nail gun 10 pivots about the bolts 113.

The nail chuck 12 is retained proximate the frame 21 with a spring 114 that is mounted to the frame 21 and the plates 112. The spring 114 biases the nail chuck 14 toward the frame 21 such that the nose 104 is within a known proximity of a desired location. The speed at which the pallet 22 is manufactured is increased by the nail chuck being driven by the hydraulic system 46 assisted by the pneumatic system 38.

Additionally, the speed at which a pallet 22 is manufactured is also increased by the pivotal attachment of the nail gun 10 to the frame 21 which allows nails 16 to be driven into the cross-boards 23 and the stringers 24 while the frame 21 with nail guns 10 is moving. With the nail gun 10 engaging the pallet 22, the nail gun 10 moves with respect to the pallet 22 by pivoting about the bolts 113 and with the chuck 12 rotating back in the direction of arrow 29. As the nail gun 10 disengages from the cross-board 23 the spring 114 returns the nail gun 10 to an upright position with respect to the frame 21.

Although the present invention has been described with reference to preferred embodiments, workers skilled in the art will recognize that changes may be made in form and detail without departing from the spirit and scope of the invention.

What is claimed is:

1. An apparatus for nailing a plurality of cross members to an underlying stringer, the apparatus comprising:

a support for supporting the stringer and the plurality of cross members;

a carriage moving in a continuous motion without stopping over the plurality of cross members during nailing of the cross members until the plurality of cross members are nailed to the stringer;

at least one nailing gun pivotally secured to the carriage for driving nails into the plurality of cross members and the underlying stringer to secure the plurality of cross members to the stringer wherein the nail gun pivots in a direction opposite the moving carriage during nailing;

a hydraulic accumulator mounted on the carriage in hydraulic communication with the at least one nailing gun for supplying hydraulic fluid under pressure to provide a force to the nailing gun for nailing the plurality of cross members to the stringer; and further comprising a pneumatic system for positioning the at least one nailing gun to a nail driving position.

2. The apparatus of claim 1 and further including controls for providing a signal to apply hydraulic fluid from the hydraulic accumulator to actuate the at least one nailing gun positioned by the pneumatic system in the nail driving position.

3. The apparatus of claim 1 wherein the at least one nailing gun includes a nail chuck and a collar having a through bore and wherein the nail chuck is positioned within the through bore of the collar and is slidable therein.

4. The apparatus of claim 3 wherein the collar comprises a linear motion bearing.

5. An apparatus for nailing a plurality of cross members to an underlying stringer, the apparatus comprising:

a support for supporting the stringer and the plurality of cross members;

a carriage moving in a continuous motion without stopping over the plurality of cross members during nailing of the cross members until the plurality of cross members are nailed to the stringer;

at least one nailing gun pivotally secured to the carriage for driving nails into the cross members and the underlying stringer to secure the cross members to the stringer, wherein the nailing gun pivots with respect to the carriage in a direction opposite to movement of the carriage while driving a nail into the cross member thereby permitting the nailing gun to nail without the carriage stopping; a pneumatic system for positioning the at least one nailing gun to a nail driving position; and further including a hydraulic accumulator and controls for providing a signal to apply hydraulic fluid from the hydraulic accumulator to actuate the at least one nailing gun positioned by the pneumatic system in the nail driving position.

6. The apparatus of claim 5 wherein the at least one nailing gun includes a nail chuck and a collar having a through bore and wherein the nail chuck is positioned within the through bore of the collar and is slidable therein.

7. The apparatus of claim 6 wherein the collar comprises a linear motion bearing.

8. An apparatus for nailing a plurality of cross members to an underlying stringer, the apparatus comprising:

a support carriage for supporting the stringer and the plurality of cross members;

a carriage moving in a continuous motion over the plurality of cross members without stopping during nailing of the cross members until the plurality of cross members are nailed to the stringer and wherein the carriage includes a hydraulic accumulator mounted thereon;

at least one nail gun secured to the carriage for driving nails into the cross members and the underlying stringer to secure the cross members to the stringer; and wherein the at least one nail gun includes a chuck portion which contacts the wood during the nailing operation and is pneumatically driven to the wood and a hydraulic cylinder for moving a nail driving mechanism through the wood chuck to drive nails into the plurality of cross members and the underlying stringer.

9. The apparatus of claim 8 wherein the nail gun includes a collar having a through bore and wherein the nail chuck is positioned within the through bore of the collar and is slidable therein.

10. The apparatus of claim 9 wherein the collar comprises a linear motion bearing.

11. The apparatus of claim 8 and further including controls for providing a signal to apply hydraulic fluid from the hydraulic accumulator to actuate the at least one nailing gun position by the pneumatic system.

* * * * *